United States Patent Office 2,918,359
Patented Dec. 22, 1959

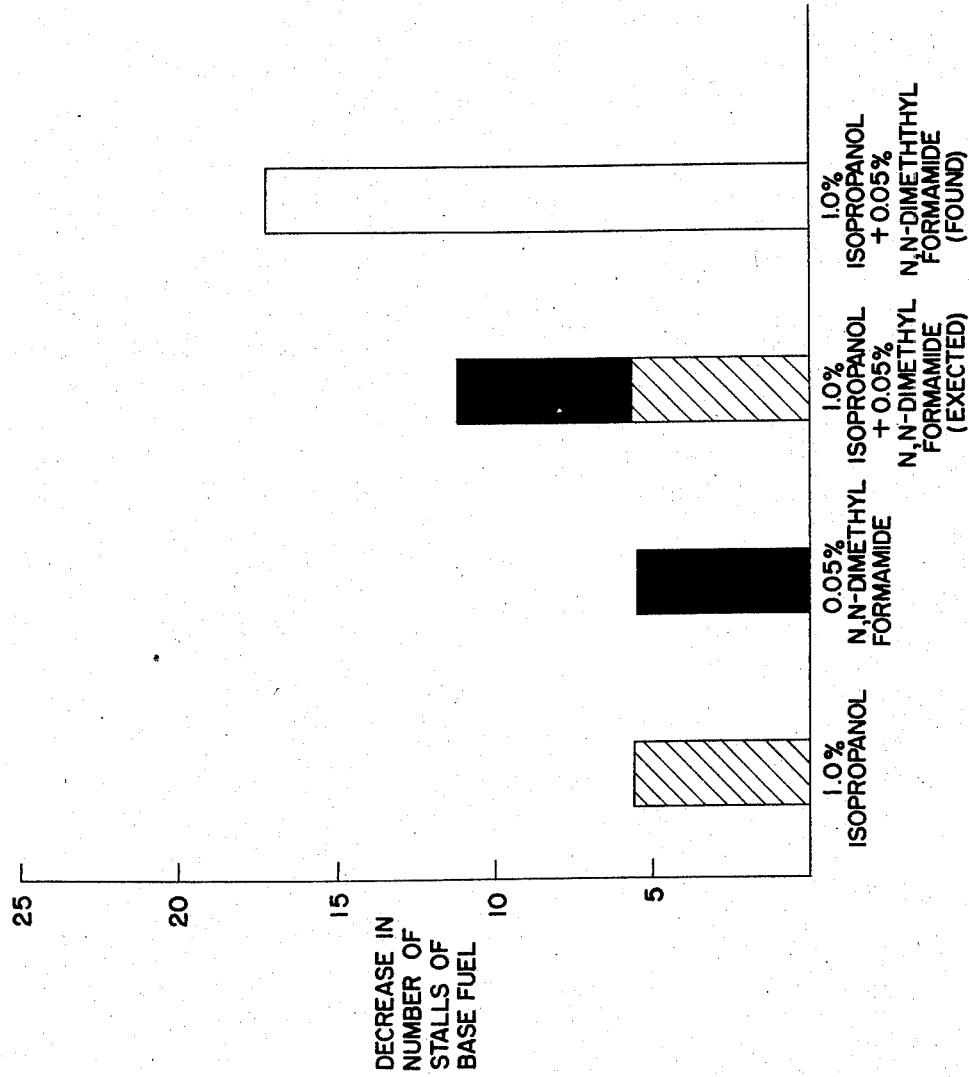

2,918,359

MOTOR FUEL

William E. Lovett, Plainfield, and Elbert D. Nostrand, Westfield, N.J., assignors to Esso Research and Engineering Company, a corporation of Delaware Application June 17, 1957, Serial No. 666,141

1 Claim. (Cl. 44—56)

The present invention is concerned with an improved motor fuel composition adapted to provide improved engine performance in automotive vehicles, motor boats and aircraft in cool, moist atmospheric conditions under which icing due to freezing of atmospheric moisture normally occurs. The motor fuel composition of the present invention comprises gasoline, which, as is well known, is essentially a hydrocarbon mixture having suitable volatility for operating internal combustion engines with spark ignition, containing as an ingredient a total of less than 2% by volume, but sufficient to decrease stalls due to icing, of N,N-di-substituted formamide, e.g., N,N-dialkyl formamide, in critical combination with a volatile alcohol or mixture of alcohols. In addition, the fuel compositions of the present invention may contain other additives, such as, oiliness agents, gum solvents, alkyl-lead anti-detonants, lead-scavenging agents, dyes, gum inhibitors, antioxidants, rust-preventives, metal-deactivators and the like, which are well known in the art as desirable ingredients of gasoline for use as motor fuel.

The N,N-dialkyl formamides in the fuel composition are similar to those described in U.S. 2,706,677, April 19, 1955, "Amines and Amides as Anti-stalling Additives," inventors Gordon W. Duncan, William E. Lifson and Joseph P. Haworth. Each of the N,N substituents contains from 1 to 7 carbon atoms. N,N-dimethyl substituents are preferred.

The novel fuel compositions of this invention are primarily intended to overcome certain operational difficulties in connection with automotive, marine, stationary, and airplane engines. The difficulties referred to are caused by ice formed from moisture in the air in the intake system of an engine and result in frequent stalling of the engine under idling conditions when the circumambient air has a relatively high humidity and is at a temperature below about 60° F. This stalling phenomenon is now well known in the art.

It will be understood by those skilled in the art that the tendency of an engine to stall under cool, moist atmospheric conditions is in part a function of fuel volatility; i.e., an engine operating on a volatile fuel is more likely to stall under such atmospheric conditions than when operating on a less volatile fuel of similar composition. It will further be understood, therefore, that in a gasoline of relatively low volatility, lower total concentrations of the critical anti-stalling additive mixtures of this invention are required than in a more volatile gasoline to give satisfactory engine performance.

The fuel may be either aviation gasoline or motor gasoline. The volatilities of these gasolines in general vary over a range of vapor pressures at 100° F. from 6 lbs./sq. in. to 15 lbs./sq. in. and over a range of "50% points," in ASTM D–86 test, from 170° to 270° F. The ASTM end point of aviation gasoline is between 250° and 350° F.; and that of motor gasoline is between 350° and 450° F. Complete specifications for gasoline suitable to be used in accordance with the present invention motor gasoline are fully defined in Federal Specification VV–M–561 a–2 of October 20, 1954, as fuel M, regular and premium grades of classes A, B and C, and all the significant limits fo volatility for motor gasoline to be used in accordance with the present invention are listed there. Also aviation gasoline is fully defined in U.S. Military Specifications MIL–F–5572–1 of July 20, 1950.

As pointed out above, the present invention is concerned with gasoline compositions containing a critical amount of N,N-dialkyl formamide compounds in combination with an alcohol.

The compounds of the present invention are N,N-dimethyl formamide and other similar N,N-dialkyl formamides, such as N,N-diethyl-, N,N-di-N-propyl-, N,N-di-isopropyl- and N-methyl-N-ethyl. The preferred compound is N,N-dimethyl formamide.

The alcohols are those containing from about 1 to 3 carbon atoms, e.g., methyl, ethyl, propyl, allyl and isopropyl alcohols. These alcohols may be represented by the general formula ROH, R being an aliphatic hydrocarbon radical. Especially preferred is isopropyl alcohol.

The amount of di-substituted formamide will depend upon the amount of alcohol used. In general, the volume percent of di-substituted formamide will be in the range of 0.01 to 0.15% by volume, while the amount of alcohol as, for example, methyl alcohol or isopropyl alcohol, should be in the range from about 0.40 to 1.8% by volume. In accordance with a particularly preferred embodiment of the present invention, the concentration of the alcohol must not be less than 10 nor more than 30 times the concentration of the di-substituted formamide. For example, to a gasoline of relatively low volatility (e.g. 50% at 270° F.) there is added 0.4% isopropyl alcohol together with 0.0114 to 0.04% dimethyl formamide. Similarly, to a gasoline of relatively higher volatility (e.g., 50% at 190° F.), there is added 1.8% isopropyl alcohol together with 0.0513% to 0.18% dimethyl formamide. In these two examples best results are obtained when the volume ratio of alcohol to di-substituted formamide is 20/1.

In order to determine the effectiveness of the fuel composition of the present invention, a number of tests were conducted on two 1956 Plymouth laboratory test engines. While the temperature and humidity were maintained at particular levels, the stalling characteristics of the engine were determined during the warm-up period. The procedure employed was to start the engine and then immediately to raise the engine speed to 1500 r.p.m. This speed was maintained for 30 seconds, after which the engine was allowed to idle for 15 seconds. If the engine stalled before 15 seconds had expired, the engine was again started and the speed immediately raised to 1500 r.p.m. for 30 seconds; while if stalling did not occur, the speed was increased to 1500 r.p.m. after the 15 seconds idling time. The alternate cycles of 30 seconds at 1500 r.p.m. followed by 15 seconds at idling were repeated until the engine was completely warmed up. The number of stalls encountered by this procedure up to the time of complete engine warm-up was then recorded.

The base fuel was a premium grade commercial gasoline having 10% ASTM distillation point of 117° F., a 50% point of 192° F. and a 90% point of 300° F. by ASTM Method D–86, which is the recognized method for measuring the volatility of gasoline. This gasoline also contained tetra-ethyl lead, scavenging agent and antioxidants, such as are conventional in the art. Various percentages of isopropyl alcohol (isopropanol) and N,N- dimethyl formamide and mixtures thereof were tested in this common base fuel as shown in Table I.

TABLE I

*Additive evaluations in 1956 Plymouth laboratory test engines* [a]

| No. | Additive | Average Stalls in 25 Cycles [b][c] | |
|---|---|---|---|
| | | Number | Percent |
| 1 | None | 22 | 100 |
| 2 | 1.0% Isopropanol | 16.3 | 74 |
| 3 | 2.0% Isopropanol | 7 | 32 |
| 4 | 0.05% N,N-Dimethyl Formamide | 16.5 | 75 |
| 5 | 0.1% N,N-Dimethyl Formamide | 8 | 36 |
| 6 | 1.0% Isopropanol<br>0.05% N,N-Dimethyl Formamide | 4.8 | 22 |

[a] Data obtained at 40° F. and 100% relative humidity.
[b] 30 seconds at 1500 r.p.m., 15 seconds at idle.
[c] Base fuel was a winter grade gasoline: 65% evaporated in ASTM D-86 at 212° F. and 13.5 lbs./sq. in. Reid vapor pressure at 100° F.

The foregoing results are graphically illustrated in the drawing, which shows that the composition No. 6 (Table I) which is a preferred embodiment of the present invention, has outstanding and unexpectedly superior effectiveness for decreasing the number of stalls.

To summarize, the preferred embodiment of the present invention is a motor fuel of the type of gasoline to which has been added a small but critical concentration, not exceeding 1.9% by volume, but sufficient to decrease stalls due to icing by at least 66% from the number of stalls obtained with the motor fuel alone, of a mixture of an alcohol having 1 to 3 carbon atoms per molecule and a N,N-dialkyl formamide, e.g., N,N-dimethyl formamide, in a volume ratio between 10 and 30 of said alcohol to 1 of said di-substituted formamide.

What is claimed is:

A gasoline having incorporated therein from about 0.4 to 1.8% by volume of isopropanol and from about 0.01 to 0.095% by volume of N,N-dimethyl formamide, the isopropanol concentration being from 10 to 30 times the N,N-dimethyl formamide concentration.

References Cited in the file of this patent

UNITED STATES PATENTS

| | | |
|---|---|---|
| 1,869,486 | Lantz | Aug. 2, 1932 |
| 2,447,615 | Jones | Aug. 24, 1948 |
| 2,646,348 | Neudeck | July 21, 1953 |
| 2,706,677 | Duncan et al. | Apr. 19, 1955 |